US 8,376,834 B2
Feb. 19, 2013

(12) United States Patent
Hirzel et al.

(54) ROLE ASSIGNMENT IN MULTIPLAYER GAMES

(75) Inventors: Holly Hirzel, Kirkland, WA (US); Brett Johnson, Woodinville, WA (US); Felix Livni, Seattle, WA (US); Hardik Shah, Bellevue, WA (US); Mike Scavezze, Bellevue, WA (US); Jay Thaler, Kirkland, WA (US); Matthew Van Gorder, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 140 days.

(21) Appl. No.: 12/776,291

(22) Filed: May 7, 2010

(65) Prior Publication Data

US 2011/0275431 A1 Nov. 10, 2011

(51) Int. Cl.
*A63F 9/24* (2006.01)
*A63F 13/00* (2006.01)

(52) U.S. Cl. .................. 463/23; 463/1; 463/42
(58) Field of Classification Search ............... 463/1, 23, 463/29, 40–42; 700/91–93
See application file for complete search history.

(56) References Cited

U.S. PATENT DOCUMENTS

| | | | | |
|---|---|---|---|---|
| 5,558,339 | A * | 9/1996 | Perlman | 463/42 |
| 5,957,775 | A * | 9/1999 | Cherry | 463/16 |
| 6,106,395 | A * | 8/2000 | Begis | 463/23 |
| 6,152,821 | A * | 11/2000 | Nakagawa et al. | 463/4 |
| 6,685,565 | B2 * | 2/2004 | Tanibuchi et al. | 463/31 |
| 7,097,559 | B2 * | 8/2006 | Okita et al. | 463/11 |
| 7,175,524 | B2 | 2/2007 | Bansemer et al. | |
| 2003/0073488 | A1 * | 4/2003 | Okita et al. | 463/30 |
| 2003/0078102 | A1 * | 4/2003 | Okita et al. | 463/42 |
| 2007/0191101 | A1 * | 8/2007 | Coliz et al. | 463/42 |
| 2007/0225070 | A1 * | 9/2007 | Zahorik et al. | 463/29 |
| 2008/0032762 | A1 | 2/2008 | Kane et al. | |
| 2008/0146346 | A1 | 6/2008 | Hardy et al. | |
| 2008/0254883 | A1 | 10/2008 | Patel et al. | |
| 2008/0266250 | A1 * | 10/2008 | Jacob | 345/156 |
| 2009/0036214 | A1 * | 2/2009 | Dahl | 463/42 |
| 2009/0049542 | A1 | 2/2009 | DeYonker et al. | |
| 2009/0061991 | A1 | 3/2009 | Popovich et al. | |
| 2009/0227313 | A1 * | 9/2009 | Minka et al. | 463/14 |
| 2010/0279767 | A1 * | 11/2010 | Dhupelia et al. | 463/29 |
| 2010/0285858 | A1 * | 11/2010 | Clowes et al. | 463/9 |
| 2011/0177863 | A1 * | 7/2011 | Davidson et al. | 463/29 |
| 2012/0172098 | A1 * | 7/2012 | Baker et al. | 463/1 |

OTHER PUBLICATIONS

Robles, "1 vs 100 on Xbox LIVE is the future of gaming", website Blog, Econsuitancy Digital Marketers United, posted Jul. 8, 2009, http://econsultancy.com/blog/4173-1-vs-100-on-xbox-live-is-the-future-of-gaming.

Nelson, "Joystiq hands-on: 1 vs. 100 (Xbox Live Primetime)", website, posted May 6, 2009, http://www.joystiq.com/2009/05/06/joystiq-hands-on-1-vs-100-xbox-live-primetime/.

Toyama, Kentaro, et al., "Probabilistic Tracking in a Metric Space," Eighth International Conference on Computer Vision, Vancouver, Canada, vol. 2, Jul. 2001, 8 pages.

\* cited by examiner

*Primary Examiner* — Milap Shah
(74) *Attorney, Agent, or Firm* — Vierra Magen Marcus & DeNiro LLP (57) ABSTRACT

Dynamic role selection of players for different roles in multiplayer gaming sessions is provided. Users seeking to participate in different roles in the game may request participation in the role. Selection of players for roles is made dynamically by varying a selection component for different sessions of the game. The selection component may be a user's game score over different time periods, and can be rotated for different sessions of the game, so that various levels of players have an opportunity to fill game roles.

19 Claims, 7 Drawing Sheets

ROLE ASSIGNMENT IN MULTIPLAYER GAMES

BACKGROUND

Multiplayer games where a number of players interact with a centralized game moderator have been popularized in different forms of media for many years. A current generation of multiplayer games allows participants to play the game using a processing device, such as a computer or gaming console, while connected to the moderator and other participants via a network and a gaming service. Some multiplayer games are organized into episodes or sessions, much in the same manner that televised game shows have in the past been divided into individual episodes. These online multiplayer games can offer incentives and prizes to participants.

Participant role selection in multiplayer games may also be needed, depending on the type of game. Role selection takes participants of various degrees of involvement in the game and assigns roles in a manner which is likely to make the game interesting to both participants, while providing a mix of users which enhances game play and entices new players to seek participation in the game.

SUMMARY

Technology is provided for dynamic role selection of players for different roles in multiplayer gaming sessions. The technology provides an opportunity for long standing players as well as new players to have an opportunity to fill roles in the game. Users seeking to participate in different roles in the game may request participation in the role. Selection of players for roles is made dynamically by varying a selection component for different sessions of the game. The selection component may be a user's game score over different time periods, such as a single session, a week or the entire time a user has participated in the game. These components can be rotated for different sessions of the game, so that various levels of players have an opportunity to fill game roles.

In one embodiment, a method for assigning roles to users in a multiplayer game organized into a plurality of sessions is provided. After a user selects a role, for each session, at least one skill metric, such as user score, is selected over a time period. A ranking score is computed based on the metric and users are ranked, and roles assigned, based on the ranking score. A bias is present against a user repeating in the same role within a given time period.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Technology is provided to selects one or more users for advanced roles in one or more sessions (or "episodes") of a multiplayer game. Skill based multi-player games may provide roles both to make games interesting and as incentives to generate interest in the game amongst various levels of users. The technology provides an opportunity for long standing players as well as new players to have an opportunity to fill elevated roles in the game.

Selection of players for elevated roles is made dynamically by varying a selection component over a number of sessions. In one embodiment, the selection component is a user's game score over different time periods, such as a single session, a week or the entire time a user has participated in the game. A ranking score based on the user's game score for a given period determines which users requesting elevated roles in the game will be assigned to those roles. Selection components can be rotated for different sessions of the game, so that various levels of players have an opportunity to fill game elevated roles.

Figure 1:
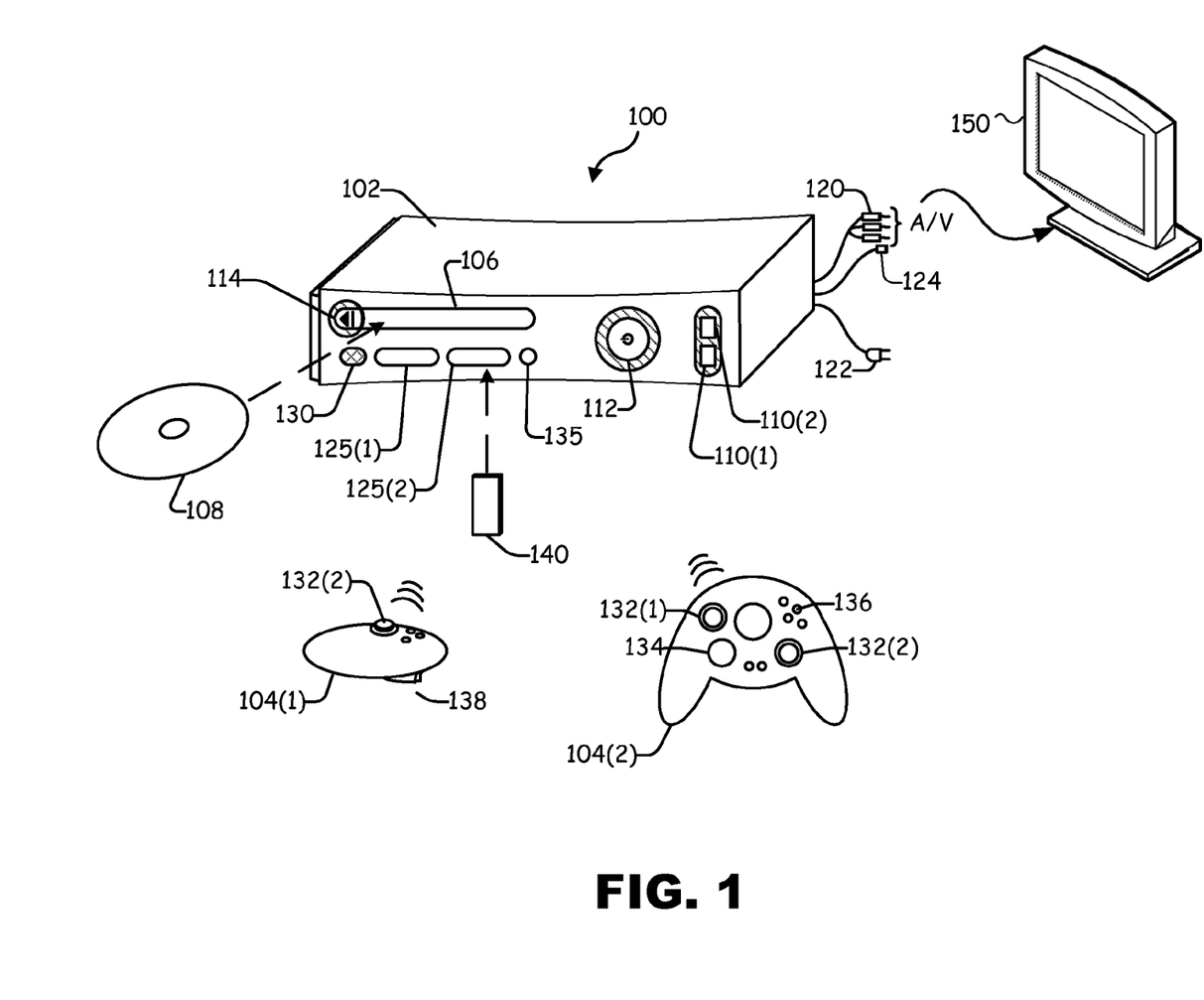
FIG. 1 depicts an isometric view of an exemplary gaming and media system.

FIG. 1 shows an exemplary gaming and media system 100. The following discussion of FIG. 1 is intended to provide a brief, general description of a suitable environment in which concepts presented herein may be implemented. As shown in FIG. 1, gaming and media system 100 includes a game and media console (hereinafter "console") 102. In general, console 102 is one type of computing system, as will be further described below. Console 102 is configured to accommodate one or more wireless controllers, as represented by controllers 104(1) and 104(2). Console 102 is equipped with an internal hard disk drive (not shown) and a portable media drive 106 that support various forms of portable storage media, as represented by optical storage disc 108. Examples of suitable portable storage media include DVD, CD-ROM, game discs, and so forth. Console 102 also includes two memory unit card receptacles 125(1) and 125(2), for receiving removable flash-type memory units 140. A command button 135 on console 102 enables and disables wireless peripheral support.

As depicted in FIG. 1, console 102 also includes an optical port 130 for communicating wirelessly with one or more devices and two USB (Universal Serial Bus) ports 110(1) and 110(2) to support a wired connection for additional controllers, or other peripherals. In some implementations, the number and arrangement of additional ports may be modified. A power button 112 and an eject button 114 are also positioned on the front face of game console 102. Power button 112 is selected to apply power to the game console, and can also provide access to other features and controls, and eject button 114 alternately opens and closes the tray of a portable media drive 106 to enable insertion and extraction of a storage disc 108.

Console 102 connects to a television or other display (such as monitor 150) via A/V interfacing cables 120. In one implementation, console 102 is equipped with a dedicated A/V port (not shown) configured for content-secured digital communication using A/V cables 120 (e.g., A/V cables suitable for coupling to a High Definition Multimedia Interface "HDMI" port on a high definition monitor 150 or other display device).

A power cable 122 provides power to the game console. Console 102 may be further configured with broadband capabilities, as represented by a cable or modem connector 124 to facilitate access to a network, such as the Internet. The broadband capabilities can also be provided wirelessly, through a broadband network such as a wireless fidelity (Wi-Fi) network.

Each controller 104 is coupled to console 102 via a wired or wireless interface. In the illustrated implementation, the controllers 104 are USB-compatible and are coupled to console 102 via a wireless or USB port 110. Console 102 may be equipped with any of a wide variety of user interaction mechanisms. In an example illustrated in FIG. 1, each controller 104 is equipped with two thumbsticks 132(1) and 132(2), a D-pad 134, buttons 136, and two triggers 138. These controllers are merely representative, and other known gaming controllers may be substituted for, or added to, those shown in FIG. 1.

In one implementation, a memory unit (MU) 140 may also be inserted into controller 104 to provide additional and portable storage. Portable MUs enable users to store game parameters for use when playing on other consoles. In this implementation, each controller is configured to accommodate two MUs 140, although more or less than two MUs may also be employed.

Gaming and media system 100 is generally configured for playing games stored on a memory medium, as well as for downloading and playing games, and reproducing pre-recorded music and videos, from both electronic and hard media sources. With the different storage offerings, titles can be played from the hard disk drive, from an optical disk media (e.g., 108), from an online source, or from MU 140.

During operation, console 102 is configured to receive input from controllers 104 and display information on display 150. For example, console 102 can display a user interface on display 150 to allow a user to participate in a multiplayer game using controller 104 based on user intent, as discussed below.

Figure 2:
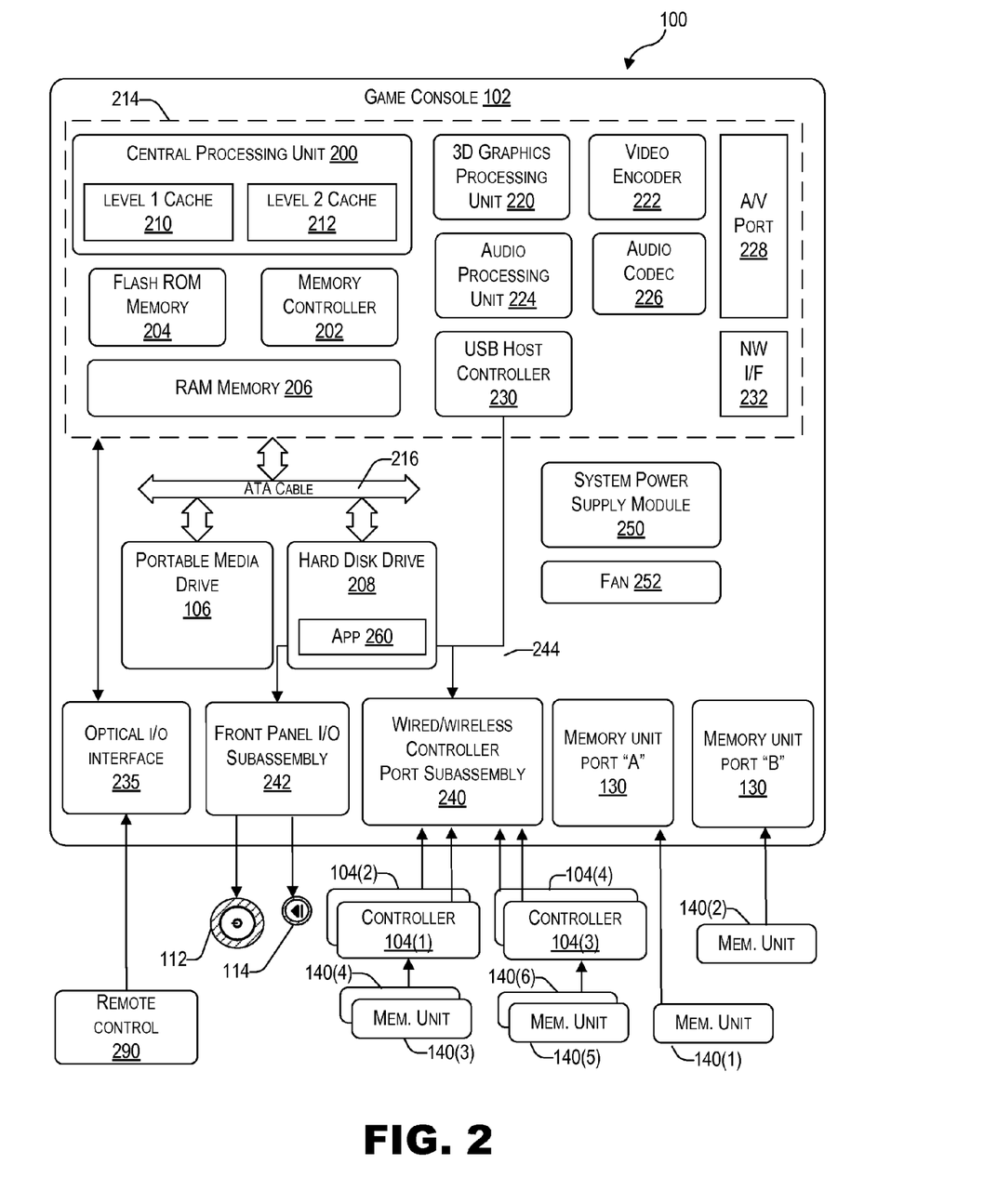
FIG. 2 is an exemplary functional block diagram of components of the gaming and media system shown in FIG. 1.

FIG. 2 is a functional block diagram of gaming and media system 100 and shows functional components of the gaming and media system 100 in more detail. Console 102 has a central processing unit (CPU) 200, and a memory controller 202 that facilitates processor access to various types of memory, including a flash Read Only Memory (ROM) 204, a Random Access Memory (RAM) 206, a hard disk drive 208, and portable media drive 106. In one implementation, CPU 200 includes a level 1 cache 210 and a level 2 cache 212, to temporarily store data and hence reduce the number of memory access cycles made to the hard drive 208, thereby improving processing speed and throughput.

CPU 200, memory controller 202, and various memory devices are interconnected via one or more buses (not shown). The details of the bus that is used in this implementation are not particularly relevant to understanding the subject matter of interest being discussed herein. However, it will be understood that such a bus might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, CPU 200, memory controller 202, ROM 204, and RAM 206 are integrated onto a common module 214. In this implementation, ROM 204 is configured as a flash ROM that is connected to memory controller 202 via a PCI bus and a ROM bus (neither of which are shown). RAM 206 is configured as multiple Double Data Rate Synchronous Dynamic RAM (DDR SDRAM) modules that are independently controlled by memory controller 202 via separate buses (not shown). Hard disk drive 208 and portable media drive 106 are shown connected to the memory controller 202 via the PCI bus and an AT Attachment (ATA) bus 216. However, in other implementations, dedicated data bus structures of different types can also be applied in the alternative.

A three-dimensional graphics processing unit 220 and a video encoder 222 form a video processing pipeline for high speed and high resolution (e.g., High Definition) graphics processing. Data are carried from graphics processing unit 220 to video encoder 222 via a digital video bus (not shown). An audio processing unit 224 and an audio codec (coder/decoder) 226 form a corresponding audio processing pipeline for multi-channel audio processing of various digital audio formats. Audio data are carried between audio processing unit 224 and audio codec 226 via a communication link (not shown). The video and audio processing pipelines output data to an A/V (audio/video) port 228 for transmission to a television or other display. In the illustrated implementation, video and audio processing components 220-228 are mounted on module 214.

FIG. 2 shows module 214 including a USB host controller 230 and a network interface 232. USB host controller 230 is shown in communication with CPU 200 and memory controller 202 via a bus (e.g., PCI bus) and serves as host for peripheral controllers 104(1)-104(4). Network interface 232 provides access to a network (e.g., Internet, home network, etc.) and may be any of a wide variety of various wire or wireless interface components including an Ethernet card, a modem, a wireless access card, a Bluetooth module, a cable modem, and the like.

In the implementation depicted in FIG. 2, console 102 includes a controller support subassembly 240 for supporting four controllers 104(1)-104(4). The controller support subassembly 240 includes any hardware and software components needed to support wired and wireless operation with an external control device, such as for example, a media and game controller. A front panel I/O subassembly 242 supports the multiple functionalities of power button 112, the eject button 114, as well as any LEDs (light emitting diodes) or other indicators exposed on the outer surface of console 102. Subassemblies 240 and 242 are in communication with module 214 via one or more cable assemblies 244. In other implementations, console 102 can include additional controller subassemblies. The illustrated implementation also shows an optical I/O interface 235 that is configured to send and receive signals that can be communicated to module 214.

MUs 140(1) and 140(2) are illustrated as being connectable to MU ports "A" 130(1) and "B" 130(2) respectively. Additional MUs (e.g., MUs 140(3)-140(6)) are illustrated as being connectable to controllers 104(1) and 104(3), i.e., two MUs for each controller. Controllers 104(2) and 104(4) can also be configured to receive MUs (not shown). Each MU 140 offers additional storage on which games, game parameters, and other data may be stored. In some implementations, the other data can include any of a digital game component, an executable gaming application, an instruction set for expanding a gaming application, and a media file. When inserted into console 102 or a controller, MU 140 can be accessed by memory controller 202. A system power supply module 250 provides power to the components of gaming system 100. A fan 252 cools the circuitry within console 102.

An application 260 comprising machine instructions is stored on hard disk drive 208. When console 102 is powered on, various portions of application 260 are loaded into RAM 206, and/or caches 210 and 212, for execution on CPU 200, wherein application 260 is one such example. Various applications can be stored on hard disk drive 208 for execution on CPU 200.

Gaming and media system 100 may be operated as a standalone system by simply connecting the system to monitor 150 (FIG. 1), a television, a video projector, or other display device. In this standalone mode, gaming and media system 100 enables one or more players to play games, or enjoy digital media, e.g., by watching movies, or listening to music. However, with the integration of broadband connectivity made available through network interface 232, gaming and media system 100 may further be operated as a participant in a larger network gaming community, as discussed in connection with FIG. 3.

Figure 3:
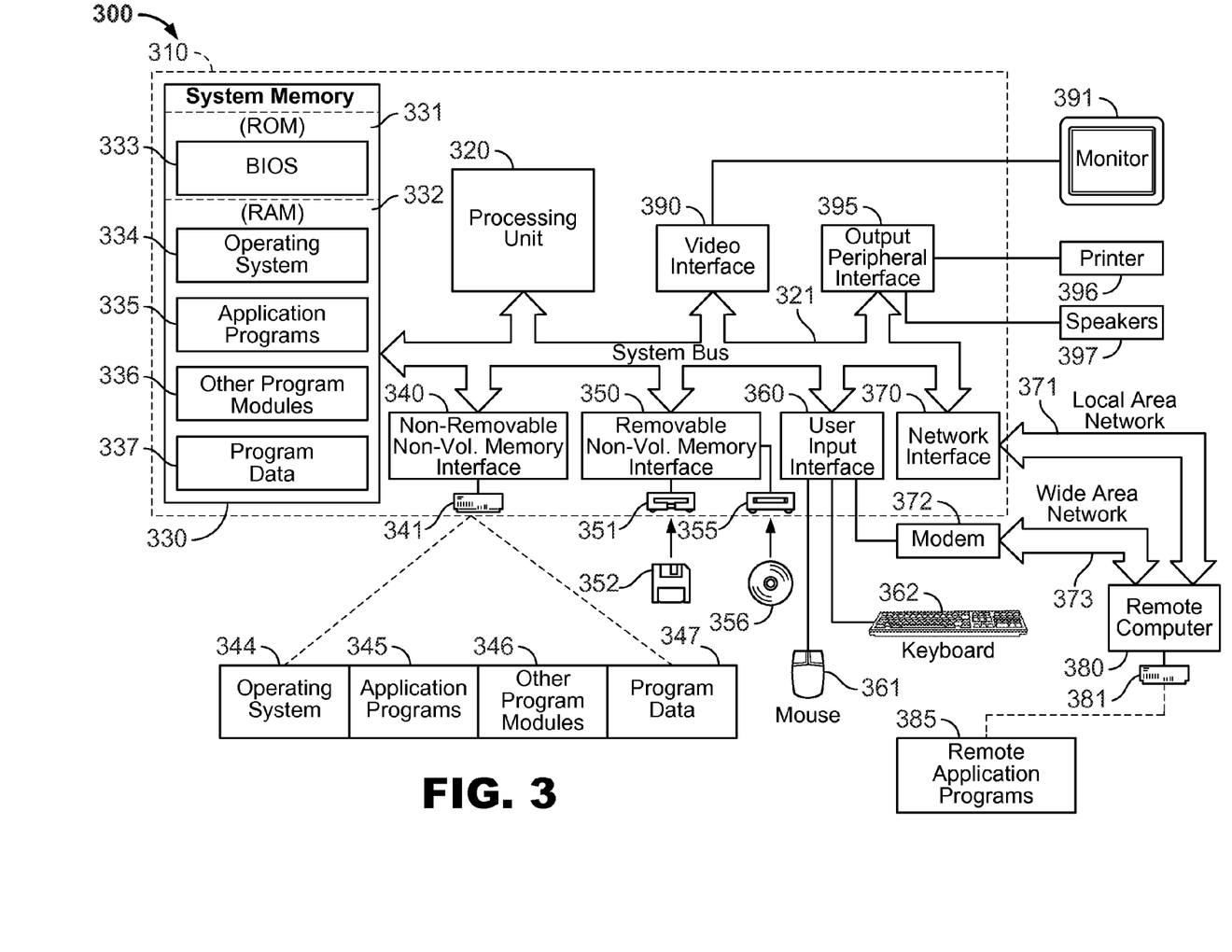
FIG. 3 illustrates another example embodiment of the gaming and media system shown in FIGS. 1-2.

FIG. 3 illustrates another example embodiment of the gaming and media system shown in FIGS. 1-2. FIG. 3 illustrates an example of a suitable computing system environment 300 such as a personal computer.

With reference to FIG. 3, an exemplary system for implementing the technology includes a general purpose computing device in the form of a computer 310. Components of computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 310 typically includes a variety of computer readable media. Computer readable media can be any available media that can be accessed by computer 310 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 310. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 3 illustrates operating system 334, application programs 335, other program modules 336, and program data 337.

The computer 310 may also include other removable/non-removable, volatile/nonvolatile computer storage media. By way of example only, FIG. 3 illustrates a hard disk drive 340 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through an non-removable memory interface such as interface 340, and magnetic disk drive 351 and optical disk drive 355 are typically connected to the system bus 321 by a removable memory interface, such as interface 350.

The drives and their associated computer storage media discussed above and illustrated in FIG. 3, provide storage of computer readable instructions, data structures, program modules and other data for the computer 310. In FIG. 3, for example, hard disk drive 341 is illustrated as storing operating system 344, application programs 345, other program modules 346, and program data 347. Note that these components can either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer 20 through input devices such as a keyboard 362 and pointing device 361, commonly referred to as a mouse, trackball or touch pad. Other input devices (not shown) may include a microphone, joystick, game pad, satellite dish, scanner, or the like. These and other input devices are often connected to the processing unit 320 through a user input interface 360 that is coupled to the system bus, but may be connected by other interface and bus structures, such as a parallel port, game port or a universal serial bus (USB). A monitor 391 or other type of display device is also connected to the system bus 321 via an interface, such as a video interface 390. In addition to the monitor, computers may also include other peripheral output devices such as speakers 397 and printer 396, which may be connected through a output peripheral interface 390.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 3. The logical connections depicted in FIG. 3 include a local area network (LAN) 371 and a wide area network (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. By way of example, and not limitation, FIG. 3 illustrates remote application programs 385 as residing on memory device 381. It will be appreciated that the network connections shown are exemplary and other means of establishing a communications link between the computers may be used.

Figure 4:
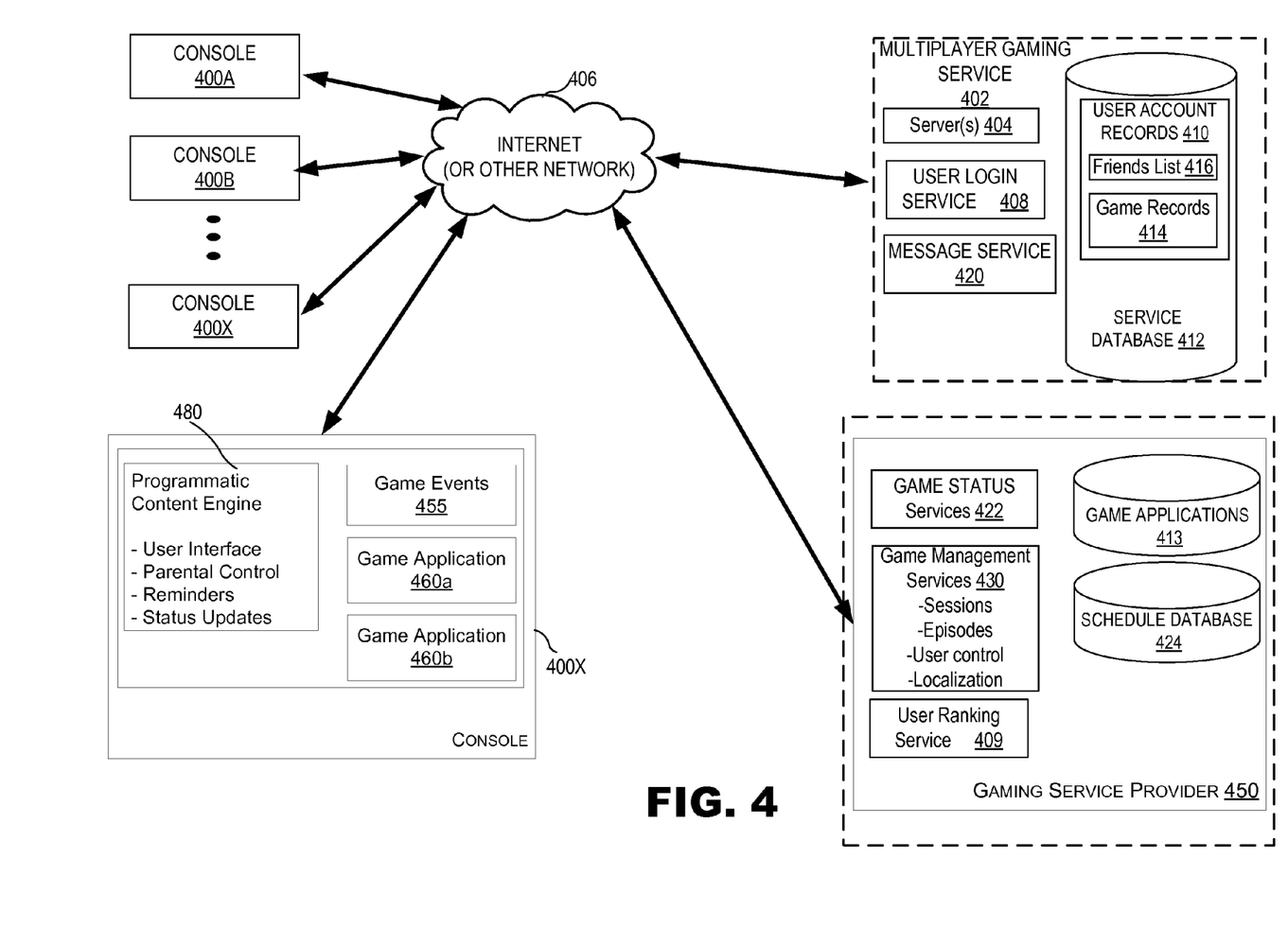
FIG. 4 is a block diagram of an exemplary operating environment for performing the operations of the disclosed technology.

FIG. 4 is a block diagram of an environment for implementing the disclosed technology. FIG. 4 illustrates a plurality of gaming consoles 400A-400X on which users may participated in online multiplayer games provided by a gaming service provider 450. The multiplayer gaming service 402 provide authentication, management and connection services to players and the gaming service provider. The multiplayer gaming service 402 and the gaming service provider 450 may be combined and offered by a single service provider and/or on a single server. Alternatively, the service providers may be different entities. In another embodiment, the gaming service provider 450 may be provided as a product in the form of hardware and software included on a non-volatile storage medium.

In one example, multiple consoles 400A-400X are coupled to a network 406 and can communicate with a multiplayer gaming service 402 having one or more server(s) 404 via network 406. Also present and coupled to the network is a gaming service provider 450. In one embodiment, network 406 comprises the Internet, though other networks such as LAN or WAN are contemplated. The server(s) 404 also includes a communication component capable of receiving information from and transmitting information to consoles 400A-X and provides a collection of services that applications running on consoles 400A-X may invoke and utilize. For example, the server(s) 404 in the multiplayer gaming service 402 may manage a plurality of multiplayer games concurrently by aggregating events from users executing one or more game applications on the consoles 400A-X. The server(s) 404 may also provide other gameplay services such as executing game play rules and outputting results to users involved in multiplayer games.

Consoles 400A-X may invoke user login service 408, which is used to authenticate a user on consoles 400A-X. During login, login service 408 obtains a gamer tag (a unique identifier associated with the user) and a password from the user as well as a console identifier that uniquely identifies the console that the user is using and a network path to the console. The gamer tag and password are authenticated by comparing them to user account records 410 in a database 412, which may be located on the same server as user login service 408 or may be distributed on a different server or a collection of different servers. Once authenticated, user login service 408 stores the console identifier and the network path in user account records 410 so that messages and information may be sent to the console.

User account records 410 can include additional information about the user such as game records 414 and friends list 416. Game records 414 include information for users identified by gamer tags and can include statistics for particular games, achievements acquired for particular games and/or other game specific information.

The friends list 414 includes an indication of friends of a user that are also connected to or otherwise have user account records with multiplayer gaming service 402. The term "friend" as used herein can broadly refer to a relationship between a user and another gamer, where the user has requested that the other gamer consent to be added to the user's friends list and the other gamer has accepted. This may be referred to as a two-way acceptance. A two-way friend acceptance may also be created where another gamer requests the user be added to the other gamer's friends list and the user accepts. At this point, the other gamer may also be added to the user's friends list. While friends will typically result from a two-way acceptance, it is conceivable that another gamer be added to a user's friends list, and be considered a "friend," where the user has designated another gamer as a friend regardless of whether the other gamer accepts. It is also conceivable that another gamer will be added to a user's friends list, and be considered a "friend," where the other user has requested to be added to the user's friends list, or where the user has requested to be added to the other gamer's friends list, regardless of whether the user or other gamer accepts in either case. In an embodiment, a user's friends list 416 may include the user's family, the user's friends and friends of the user's friends.

User account records 410 also include additional information about the user including games that have been downloaded by the user and licensing packages that have been issued for those downloaded games, including the permissions associated with each licensing package. Portions of user account records 410 can be stored on an individual console, in database 412 or on both. If an individual console retains game records 414 and/or friends list 416, this information can be provided to multiplayer gaming service 402 through network 406. Additionally, the individual console has the ability to display information associated with game records 414 and/or friends list 416 without having a connection to multiplayer gaming service 402.

The multiplayer gaming service 402 also includes a message service 420 which permits one console, such as console 400A, to send a message to another console, such as console 400B. The message service 420 is known, the ability to compose and send messages from a console of a user is known, and the ability to receive and open messages at a console of a recipient is known. Mail messages can include emails, text messages, voice messages, attachments and specialized in-text messages known as invites, in which a user playing the game on one console invites a user on another console to play in the same game while using network 406 to pass gaming data between the two consoles so that the two users are playing from the same session of the game. Friends list 416 can also be used in conjunction with message service 420.

In accordance with the technology, the gaming service provider 450 allows a multitude of users on consoles 400A-400X to participate in a group game environment. The group may be as small as two users and may include hundreds of thousands of users. The gaming service provider 450 obtains game data and state information from the multiplayer gaming service 402, which it uses to provide information to console users. It will be understood that the gaming service provider 450 and the multiplayer gaming service 402 may be integrated into a single service and/or a single server. Alternatively, the gaming service provider 450 may not be managed by the same administrator of the multiplayer gaming service 402 or different administrators.

Also shown in FIG. 4 with respect to the gaming service provider 450 are game status services 422, game management services 430 and a user ranking service 409.

The game status services 422 collect user game statistics and tracks which friends of a particular user on one of the consoles 400A-300X are participating or scheduled to participate in an online program game. Game management services 430 provide the gaming environment while control over game play may be handled by the multiplayer gaming service 402. Alternatively, control over game play may be provided by the game management services 430. In addition, the game management services 430 may provide organization of the program game content, breaking down the games into different sections, episodes, organizing the games into different channels, and ensuring that localized content is directed to the proper console and user.

In one embodiment, the gaming service provider provides a multiplayer online game divided into sessions or episodes. The game may include any number of participants in different roles, and may be moderated or "hosted" by a live individual or a programmed controller. Scoring and game play may vary based on the rules of different games.

Also included in the gaming service provider 450 are a scheduling database 424 and a library of game applications 413. The library of game applications 413 may comprise instructions executed on each of the consoles to allow one or more users interacting with the console to participate in a multiplayer game. The schedule database 424 can be used to provide status services to each console to indicate which of the user's particular friends might be participating in a programmatic game.

Console 400X illustrates functional components which may be present on each of the consoles 400A-400X. Each console 400A-400X may be of a type such as that illustrated in FIGS. 1-3, wherein the functional components may comprise one or more sets of instructions or applications instructing the processor 200 to perform the functions described herein. Such functional components may be implemented in hardware, software or a combination of hardware or software. Moreover, the instructions may be embodied in a computer readable medium. A computer readable medium may include volatile and nonvolatile, removable and non-removable media implemented in any method or technology for storage of information such as computer readable instructions, data structures, program modules or other data. Computer readable media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by consoles 400A-400X.

Console 400X (as well as consoles 400A-300N) may include one or more game applications 460*a*, 460*b*. The game applications may be delivered via a download from the game applications data store 412, may be present in non-volatile memory such as Flash ROM memory 204 in the console, or may be provided on a computer storage medium such as a CD ROM, or other disk. Some components of each game application may be provided on the console while others remain in the gaming service or with the gaming service provider. The console 400X also includes a programmatic content engine 480 that may include parental control functionality, game reminder functionality, and friend or game status updates. The programmatic content engine 480 may also provide a set of foundational components such as libraries, methods, tools and data which are re-usable by programmatic content games running on the console. When games are executed on the console, new game events 455 occur when a user provides input to the game, or as a result of another user's input to the game being returned to the console. Events caused by user activity on the console 400X are transmitted to the multiplayer gaming service 402 which manages the game playing function.

Figure 5:
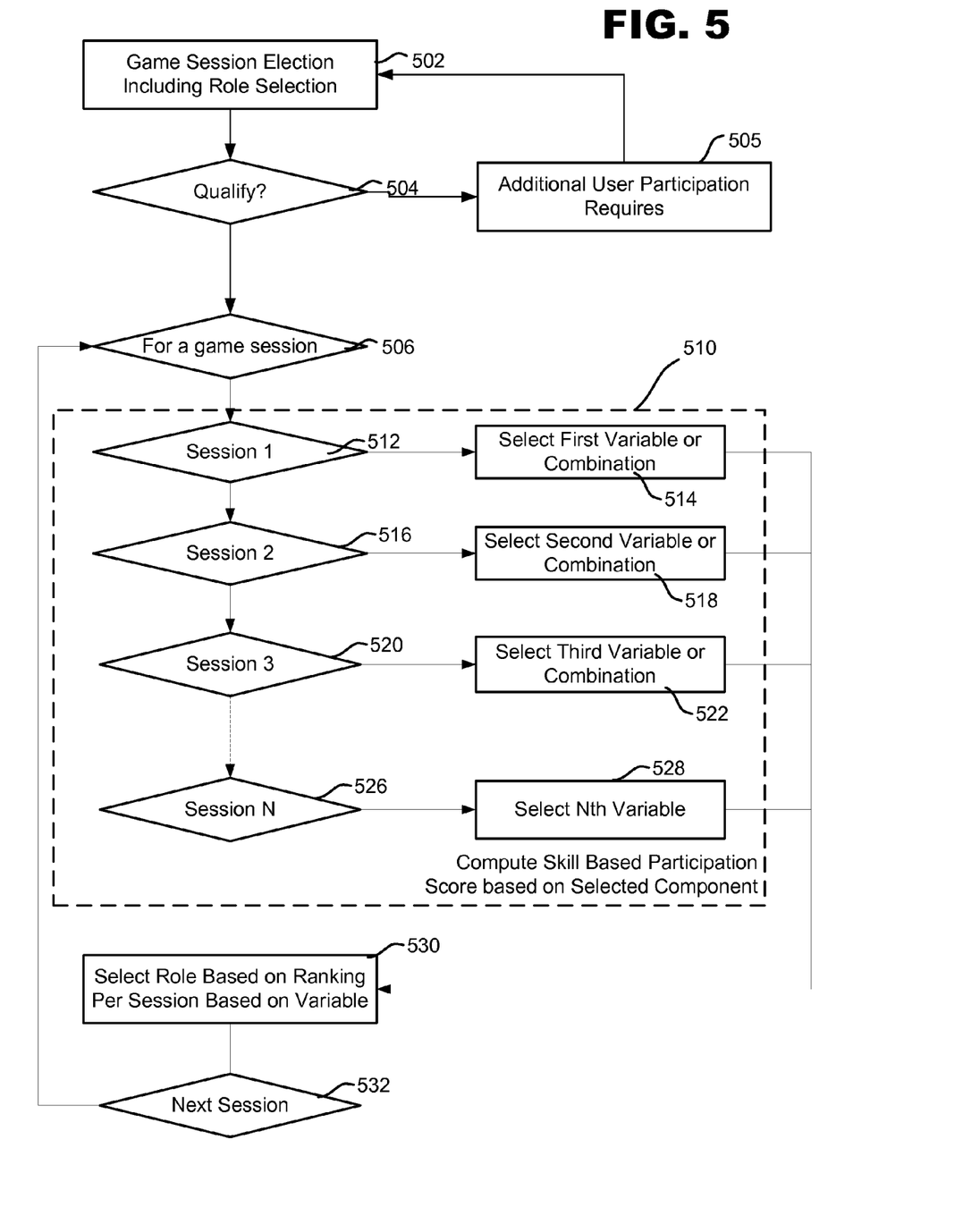
FIG. 5 is a flow chart illustrating a method for dynamically selecting users for roles in an online multiplayer game.

FIG. 5 is a flow chart illustrating a process suitable for implementing the technology disclosed herein. The technology presented selects one or more users for elevated roles in one or more sessions (or "episodes") of a multiplayer game. The technology is applicable to any skill based game wherein users may be provided with greater incentives based on different roles within the game. Use of different roles which provide player with an advantage during game play may be used as incentives to generate interest in the game amongst various levels of users. In order to incentivize long standing players, role selection should provide some benefits to such advanced players. Similarly, casual or relatively new participants in the game should have some chance of being selected for elevated role participation in order to generate interest from new players.

At 502, a game session election is made by a user. The selection will include an elevated role selection for the game. In one embodiment, an on-line multiplayer game will include different roles for different players. One role may comprise a basic role for an unlimited or very large number of users to allow participation by anyone desiring to play some part of the game to participate. Other, higher level roles may be provided which give a player greater challenges and greater rewards. In order to qualify for elevated roles, the game administrator may require some level of participation prior to allowing a user into the elevated role.

One example of such a multiplayer game is "1 vs. 100", where at least three roles are provided. The basic format of 1 vs. 100 includes one player selected to play the game in an elevated role of "The One" against 100 other people, collectively known as "The Mob." Everyone else remains in a role of "The Crowd". During game play, a question is posed, and the One and the Mob must select an answer from three choices. If the One gets the question wrong, the game is over and prize money is split up amongst the Mob. If the One gets the answer right, members of the Mob who got the question wrong are eliminated. The payout goes up as members of the Mob are eliminated. The One can opt to quit with their winnings at various intervals, or press their luck and continue on. To win the game outright, the One must eliminate all 100 members of the Mob by answering questions correctly.

The Crowd is a role which allows players not in the role of the Mob and the One to compete in the game. Top members of the Crowd can win prizes. Each of the elevated roles provides greater incentives for players in that role. Note that some games, including the aforementioned 1 vs. 100, may need a minimum number of users to complete a game session. In the above example, at least 102 players are required—one player in the role of the One, one hundred players in the role of the Mob, and at least one player in the role of the Crowd.

When selecting an elevated role at 502, the user may or may not have some participation credit in the game which is being selected. In order to allow users to participate in elevated roles in the game, a qualification check can be made at 504. Qualification can take many forms depending on the format of the game and choices by the game designer. In one embodiment, qualification is based on at least some participation in a basic role in the game by the user. In alternative embodiments, no qualification is required. In the following example, qualification is based on at least some participation in a basic role.

If the user is not qualified at 504, the user may be prompted at 505 to participate in one or more qualifying sessions to allow the user to accumulate enough participation to attempt to qualify for higher levels in the game session at 504. At 506, for each game session, the steps indicated at box 510 may be performed to select the user role based on individual game sessions and skill-based metrics. For a first session 512, a first component or combination of components may be selected at 514. Likewise, for a second session 516 and a third session 520, a second component or combination of components 516 or a third component or combination of components at 522 may be selected. Any number of sessions as indicated by session "N" at 526 and any number of components or combination of components at 528 may be used to select an elevated role at 530 based on the ranking of the user for a given session based on a given set of participation components. In one embodiment, the first, second, third and Nth components are different for each session. In an alternative embodiment, one or more of the components may be the same for different sessions. In general, participation components may include a user's absolute score in a game as computed by the game rules, metrics based on a particular time such as how long a user has been participating in the game, or score as a function of time so that a user efforts within a particular time window are used to compute the user's availability to participate in a particular role in a gaming session.

At steps 514, 518, 522 or 528, any number of skill based components may be used in a function to compute a user assignment to a particular role in a game. In one embodiment, the components selected at steps 514, 518, 522 or 528, compute a ranking score at 530 that is used to select the user's role. Selected users having ranking scores meeting criteria defined by a game administrator may be selected for elevated roles. In one embodiment, role selection is based on ranking the users relative to their highest to lowest ranking score, with users having a higher score selected for elevated roles.

Any number of methods for selecting the elevated role based on a ranking per user session may be provided. In one embodiment, a "session" may comprise an "episode", where an episode is a pre-scheduled game event with a specific duration. However, sessions need not be pre-scheduled or have a specific duration. The method repeats at 532 for each session scheduled.

Figure 6:
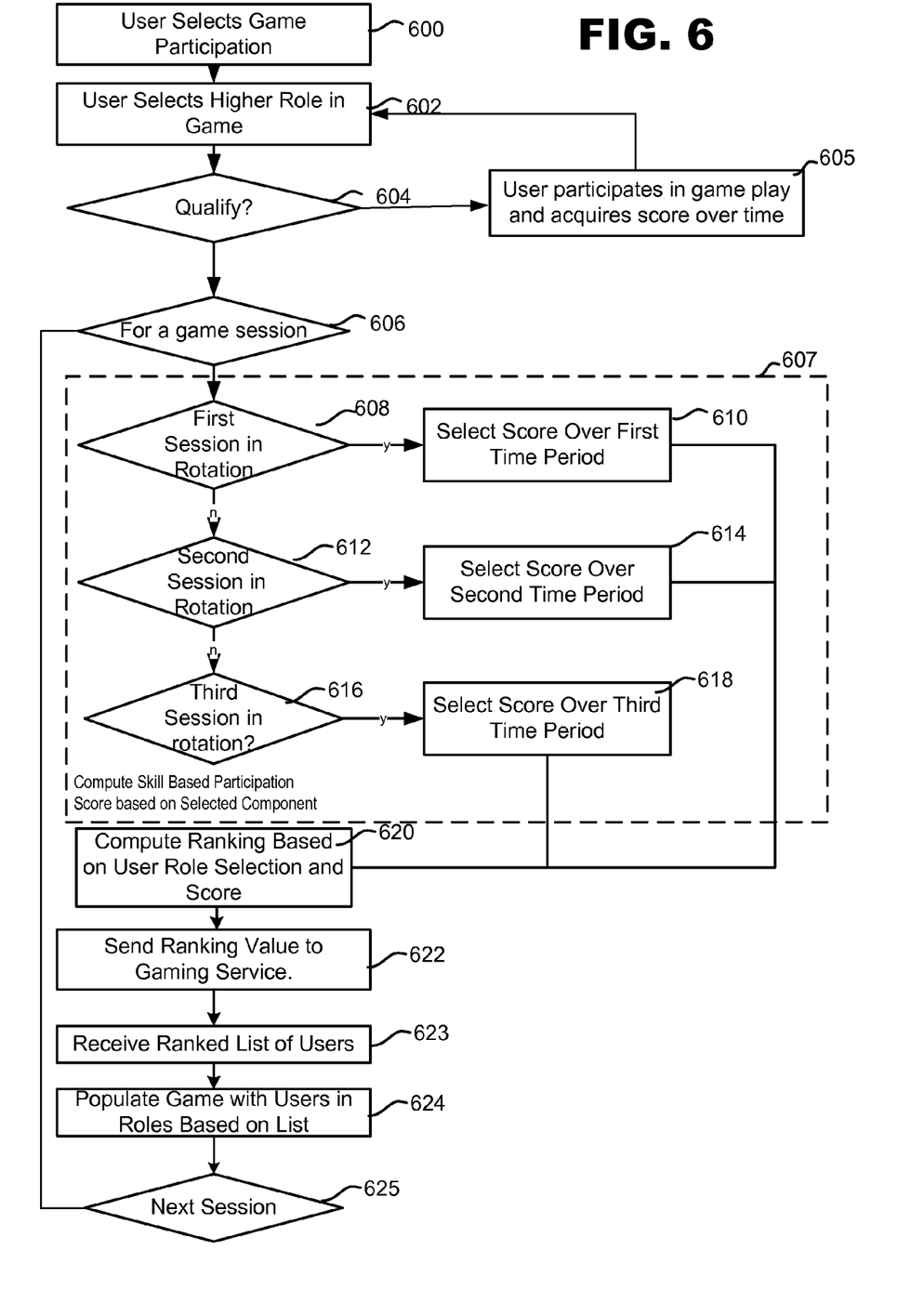
FIG. 6 is a second embodiment of a method for dynamically selecting users for roles in an online multiplayer game.

A specific example of a skill-based game utilizing the ranking system as disclosed in FIG. 5 is illustrated in FIG. 6. In the example of FIG. 6, a method for selecting users in roles for the online multiplayer game 1 vs. 100 is shown. At 600 in FIG. 6, a user may optionally select to participate in one or more gaming session(s) wherein the user has a base role or, in the case of 1 vs. 100, participates in the role of the Crowd. In the context of the game, the user may generate one or more metrics based on skill and participation as a result of the user's participation in the game.

In FIG. 6, at 600, the user selects to participate in an online multiplayer game. In 600, the user may or may not have participated in the game before. At 602, a user selects to be participated in a higher role in the game—in this case the user selects to participate as the One or the Mob. A qualification check is made at 604 and if the user has not participated in the game, at 605, the user may participate in game play and acquire a score over time. In the 1 vs. 100 example, the game includes a single player, the One, a Mob, comprised of, for example, 100 players, and a Crowd comprised of all players who wish to participate in the game but do not have specific elevated roles such as the One or the Mob. Users who have no participation basis in the game, participate in the game to acquire a score over time. Once a user has acquired some score, at 605, the user may select a role in the game.

At 602, the user may desire to participate as the role of the One or the Mob. In order to acquire higher prizes in the game, the user will select a role giving the user his best chance to achieve a higher score or prize. As will be understood, the role and the manner of selection of a role can vary from game to game. In one embodiment, players may simply choose to remain private or public in game play, and users choosing private will never be selected for an elevated role such as the One or the Mob. At 606 for every game session, the steps in box 607 are performed to compute a skill based participation score based on a skill component. In one embodiment, the skill component is the user's game score which reflects the user's accuracy and speed in answering questions.

At 607, three components are used in a rotation over a series of sessions. The components may comprise a user's game score during a selected time period. In a first session in the rotation at 608, a user's score over a first time period at 610 is used. Likewise, for second and third sessions in the rotation, at 612 and 616, the user's score over a second period of time 614 or third period of time 618 are utilized. The score is the user's score as determined by the rules of the particular game. A first time period may, for example, comprise the entire time the user has participated in the game, a second time period may comprise a shorter time period, such as a week, and a third time period may comprise an even shorter time period such as, for example, a single game session. This allows the users of varying participation a chance to achieve the elevated role in game playing.

Figure 7:
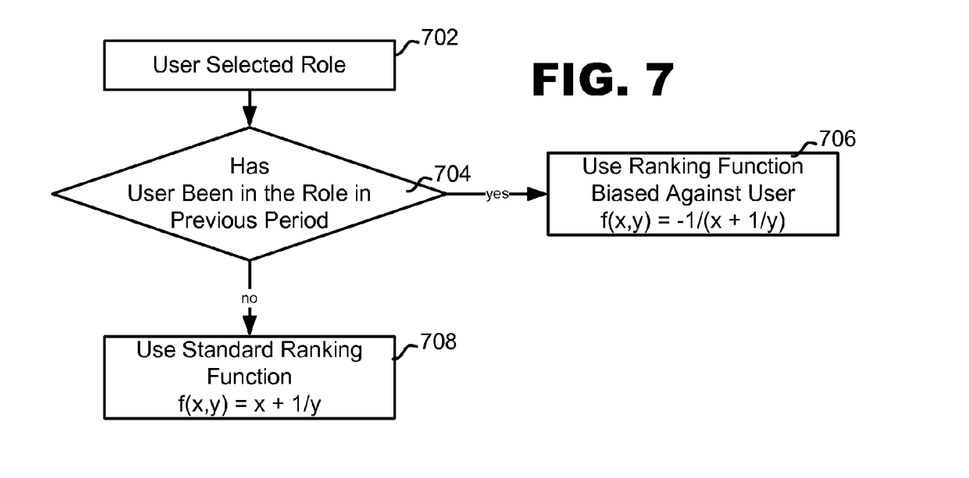
FIG. 7 is a flow chart illustrating a method for computing a ranking score.

At 620, the user's ranking score is computed based on the component used. A process for computing a ranking score is illustrated in FIG. 7. Once the ranking score is computed, the ranking score is sent to the gaming service at 622 where it will be used to assign roles by the gaming service. In one embodiment, the gaming service will return a ranked list of all users in elevated roles to the console at 623 and the game will be populated with the elevated users in such roles based on the user's position on the ranked list at 624. It will be understood that in one embodiment, this population and ranking can occur on the console, while in other embodiments the gaming service may return a specific role assignment for the console user (and/or a list of other users in elevated roles which have been pre-assigned by the service). The console then waits for the next session at 625.

FIG. 7 illustrates a process for computing a ranking score. In one embodiment, the ranking score includes a skill component and a tie breaking component, and is biased against users who have participated in the elevated role previously.

At 702, once a user selects a role, a determination is made as to whether or not the user has been previously selected for that role or another role which would justify a bias against selecting a user for an elevated role. Bias against users who have participated in an elevated role may be maintained for some time period and then removed. If the user has been previously selected for the elevated role, a computing using a biased ranking function is made at 706. If the user has not been selected for an elevated role previously, then the standard ranking function is utilized at 708.

Figure 8:
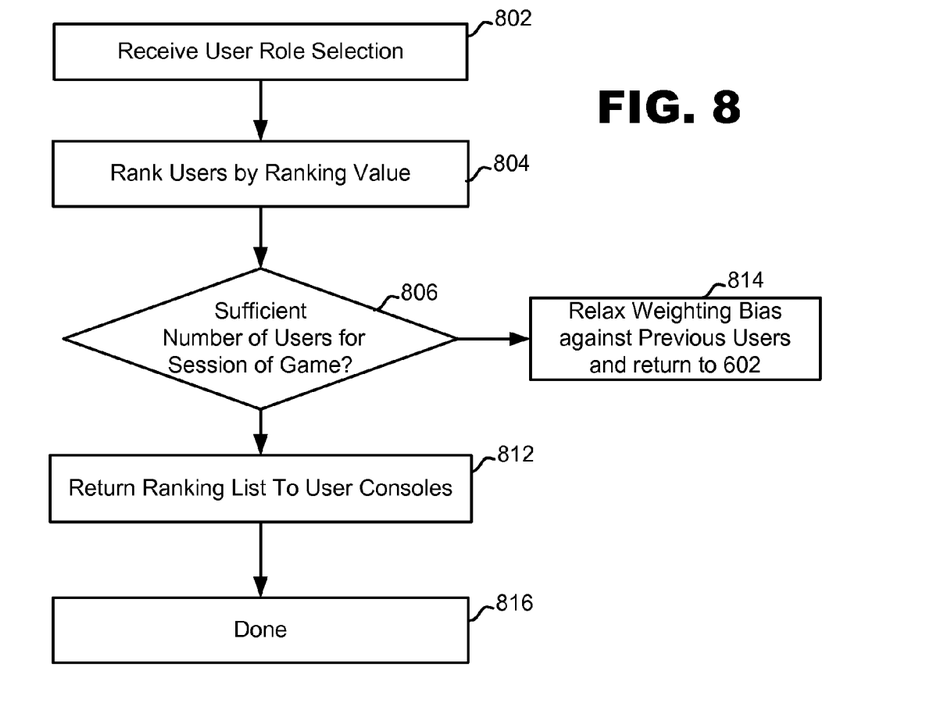
FIG. 8 is a flow chart illustrating a method for ranking users.

The technology herein ensures that many people, especially mid or late season players in a particular session, have a chance to participate in different elevated roles. In the functions used in steps 706 and 708, skill is the dominant element in determining role for a user. Skill may be determined by the game score and hence the rules of the particular game in use. In one embodiment, a ranking score computation is designed so that a single 64-bit value is created that can be sorted to determine the top players as illustrated in FIG. 8. A primary selection criterion (e.g. skill) is the most significant part of the number and tiebreakers become the least significant part. In alternative embodiments, other selection criteria can be used. Other such metrics for selection criteria may include participation, number of questions answered, speed of questions answered, accuracy of questions answered, all of which can be measured over different time periods.

In general, a ranking score function can be described as $f(x1, x2, x3 \ldots xn)$, where f is a function of n independent variables returning a score over which the users are ranked. The range of the function is some number of bits in the function should have criteria that balance various factors in the game. Certain selection criteria, such as the number of questions answered, would have a much greater chance of resulting in a tie between the numbers of different players. As such cases, a tiebreaker component is used (a secondary selection of criteria) to break any possible ties. In one embodiment, it is desirable to perform the selection in one pass of the function.

As illustrated in FIG. 7, one ranking function may comprise $f(x, y)=x+1/y$, where x is a value that can be any one of the three criteria described above (such as a user score over a session, week or since inception) and y is a fractional number utilized as a tiebreaker. Y may comprise a time, in milliseconds, that the user has been playing the game If the user had been in the role they were applying for previously, then $f(x, y)=-1/(x+1/y)$. This allows for all eligible or ineligible players to be gauged on the same set of values with a single pass.

FIG. 8 illustrates the process provided by the game management service to select users for an elevated role. At 802, the user's role selection is received. As noted above, this may be an explicit or implicit selection, the latter based on whether the user selects to remain private in game participation. At 804, the users are ordered by the ranking value of the particular gaming session. The list may include the user's ranking and/or an assignment of the user to a particular role. Where the entire users list is returned to the user game device, the game device may derive role selection by reference to each user's placement on the list. In one embodiment, the game is populated with users in particular roles on the console, while in an alternative embodiment, the role assignment is made by the service. In one embodiment, where the aforementioned 1 vs. 100 game is used, the ranking comprises of assigning the user with the highest ranking score to the role of the One, assigning the user with scores 2 through 101 to the role of the Mob, and assigning all other users to the role of the Crowd. In alternative embodiment, elevated roles may be assigned based on different rankings of users relative to their ranking score, including, for example selecting users other than the highest ranked user for the One (e.g. 10th or 20th user), or selecting a random user in a range of users ranked on the list (e.g. a random selection of those placing 1-10 on the list). At 806, a determination is made as to whether a sufficient number of users have been provided for in the game, If so, the ranking list (or role assignment) is returned at 812. If not, then at 814 the selection process returns to 602 and the process from 602 to 806 is repeated (at 814) until a sufficient number of players (such as 102 in the 1 vs. 100 example) are in the game.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer implemented method for assigning a role to each user in a plurality of users in an online multiplayer game implemented by a processing device, the game organized into a plurality of sessions and having a plurality of gameplay roles including at least an elevated gameplay role, the plurality of gameplay roles comprising different gameplay incentives, comprising:
    receiving a selection of the gameplay role from two or more users of the plurality of users to participate in a session of the game; and
    for the session:
    selecting a plurality of metrics for use in determination of a gameplay role for the two or more users over a time period,
    computing a ranking score for each of the two or more users based on the plurality of metrics over the time period by assigning a function to each selected metric,
    ranking the two or more users based on the ranking scores, and
    assigning a role to each of the two or more users in the multiplayer game based on the ranking, including assigning at least one of the two or more users from whom a selection was received to the elevated gameplay role.

2. The method of claim 1 wherein the plurality of metrics comprises a skill based metric.

3. The method of claim 2 wherein the skill based metric comprises a game score and the game score is determined based on rules of the game.

4. The method of claim 2 wherein the time period comprises an alternating one of a session, an hour, a day, a week, and a total time a user has participated in the game.

5. The method of claim 2 wherein the step of computing comprises using a skill component and a tie breaking component.

6. The method of claim 1 wherein the step of computing includes computing the ranking score based on a first function if the user has not participated in the role and based on a second function biased against the user if the user has participated in the role.

7. The method of claim 1 wherein the time periods comprises one of three time periods used in a rotation over the plurality of sessions such that in a first session in the rotation, a first time period is used, over a second session in the rotation, a second time period is used and in a third session, a third time period is used, each of the first, second and third time periods being different.

8. The method of claim 1 further including receiving user participation in the game prior to receiving the request.

9. The method of claim 1 wherein the plurality of metrics comprises one of a user participation in the game, speed, accuracy, and/or number of questions answered.

10. A computer implemented method for determining a role for each of a plurality of users in an online multiple game operated by a processing device, comprising:
    providing the online multiple game organized into a plurality of sessions, each session having a time period and a plurality of gameplay roles, including at least two different gameplay roles with different game incentives in the session;

receiving a gameplay role request from a plurality of users to participate in the session in the different gameplay roles;

determining a ranking for each of the plurality of users, the ranking being determined based on a plurality of skill based parameters derived from user participation in the online multiplayer game; and outputting the ranking of users, the ranking determining one or more users in the plurality of users filling each different gameplay role, and the ranking being determined by assigning a function to each of the plurality of skill based parameters.

11. The method of claim 10 wherein the at least two different gameplay roles include a first role having a higher chance of success in succeeding in the game than a second role.

12. The method of claim 10 wherein said step of determining comprises, for each session, selecting at least two skill based parameters over a time period, computing a ranking score for each of the plurality of users based on the at least two skill based parameters over the time period, and ranking the users based on the ranking score.

13. The method of claim 12 wherein said step of determining uses a different time period for each session and the time period comprises one of a session, an hour, a day, a week, or a total time a user has participated in the game.

14. The method of claim 13 wherein the at least two skill based parameters comprise one skill based parameter and a tie breaking component.

15. The method of claim 14 wherein the step of computing comprises summing the one skill based parameter and an inverse of a total time a user has participated in the online multiplayer game.

16. The method of claim 12 wherein the step of computing includes computing the ranking score for each of the plurality of users based on a first function if a user has not participated in the role and based on a second function biased against the user if the user has participated in the role.

17. A computer implemented process providing an interactive networked multiplayer game operated by a processing device having a plurality of users in a plurality of game roles in one or more sessions of the multiplayer game, comprising:

providing a general user role allowing a user to participate in one or more sessions of the multiplayer game to generate a skill based score in the one or more sessions of the multiplayer game;

providing an elevated role subject to different gameplay incentives than the general user role; receiving a request from the user to participate in the elevated role in a session of the one or more sessions of the multiplayer game;

for each user whom a request to participate in the elevated role has been received, determining a user ranking score based on participation by the user in one or more previous sessions in which the user has generated a skill based score based on a plurality of metrics, the ranking score being based in part on the skill based score during the one or more previous sessions over a time period, and a tie breaking score;

comparing the user ranking scores from plurality of users from whom a request to participate in the elevated role has been received;

assigning users to the elevated role and to the general user role based on each user's ranking score; and starting a game session with users in the assigned roles.

18. The computer implemented process of claim 17 wherein the step of determining includes computing the ranking score for each of the plurality of users based on a first function if a user has not participated in the role and based on a second function biased against the user if the user has participated in the role.

19. The computer implemented process of claim 17 wherein the receiving, determining, comparing and assigning steps are repeated if an insufficient number of requests from users to fill all roles required for the game are received.

* * * * *